United States Patent [19]

Pfeiffer

[11] Patent Number: 4,556,079

[45] Date of Patent: Dec. 3, 1985

[54] ROTARY VANE VALVE INCLUDING MEANS FOR ENSURING UNIFORM DISTRIBUTION OF PURGE GAS

[75] Inventor: John W. Pfeiffer, Hughesville, Pa.

[73] Assignee: Koppers Company, Inc., Pittsburgh, Pa.

[21] Appl. No.: 546,373

[22] Filed: Oct. 28, 1983

[51] Int. Cl.[4] .......................... B08B 5/00; F16K 51/00
[52] U.S. Cl. ......................................... 137/240; 277/3; 414/219
[58] Field of Search .................. 137/238, 240, 246.22; 222/188, 368, 542; 277/3, 53, 54, DIG. 1, DIG. 5; 406/65, 67; 414/219, 220

[56] References Cited

U.S. PATENT DOCUMENTS

| | | | |
|---|---|---|---|
| 1,806,515 | 5/1931 | Zoelly | 277/54 |
| 2,448,717 | 9/1948 | Jeffcock | 277/53 |
| 2,903,970 | 9/1959 | Elovitz et al. | 277/12 |
| 3,109,658 | 11/1963 | Barrett et al. | 277/3 |
| 3,199,145 | 8/1965 | Tiemersma | 277/3 |
| 3,580,587 | 5/1971 | Born et al. | 277/3 |
| 3,580,588 | 5/1971 | Allen et al. | 277/32 |
| 3,701,537 | 10/1972 | Born et al. | 277/3 |
| 3,791,657 | 2/1974 | Bilski | 277/53 |
| 4,177,999 | 12/1979 | Raber | 277/112 |
| 4,397,657 | 8/1983 | Selep et al. | 414/220 |
| 4,475,735 | 10/1984 | Smuda et al. | 277/3 |

Primary Examiner—George L. Walton
Attorney, Agent, or Firm—Daniel J. Long; Herbert J. Zeh, Jr.

[57] ABSTRACT

A rotary vane valve having a cylindrical housing with a pair of opposed end bells and an interior axial shaft. A pair of spaced shroud structures are fixed to the shaft at the ends of the vanes to generally separate the interior of the cylindrical housing from the end bells. These shroud structures are spaced from the cylindrical housing at their outer peripheral edges, but an annular throttle plate is spaced axially outwardly at a close distance from these shrouds and adjacent at its outer edge to the cylindrical housing to increase the velocity of purge gas flowing inwardly between the cylindrical housing and the outer peripheral edge of the shroud so that the escape of gas from the interior of the cylindrical housing is effectively prevented. The inner lateral surface of the annular throttle plate is divided into a low pressure zone adjacent the inlet opening and a high pressure zone adjacent the outlet opening in situations where the inlet opening is at a lower pressure than the outlet opening. The low pressure zone is roughened or has a plurality of radially spaced, concentric arcuate grooves while the high pressure zone is recessed with the result that frictional resistance to the flow of purge gas will be greater in the low pressure zone than in the high pressure zone so that the flow of purge gas will tend to be uniformly distributed at all points along the periphery of the throttle plate.

12 Claims, 5 Drawing Figures

ROTARY VANE VALVE INCLUDING MEANS FOR ENSURING UNIFORM DISTRIBUTION OF PURGE GAS

CROSS REFERENCE TO RELATED APPLICATION

This application is related to a copending application Ser. No. 499,783, filed May 31, 1983 in that both applications deal with improvements in rotary vane valves and are assigned to the same party and in that the inventor of the present invention was one of several joint inventors listed in said related application.

BACKGROUND OF THE INVENTION

1. Field of the Invention

The present invention deals with rotary vane valves and, in particular, with means for limiting fluid leaks from such valves.

2. Description of the Prior Art

Rotary vane valves are used as airlock devices for transferring particulate solids between two regions or systems having different pressures or gas compositions. It is generally desirable that leakage be held to a minimum since such leakage can result in changes in pressure in either region or can constitute a hazard or create deleterious effects such as corrosion, contamination, erosion or systemic loss of efficiency.

Typical rotary vane valves consist of a cylindrical housing, with opposed inlet and outlet openings for material, and a rotating unit within the housing having a number of pockets for transferring material from inlet to outlet, much as a revolving door permits traffic to pass from a warm area to cold area with a minimum loss of heat. In certain rotary vane valves, the vaned rotor is fitted with annular side plates, called shrouds, which are welded to the ends of the vanes. The closer the clearances between housing and rotating unit can be held, the less leakage or loss of pressure there will be.

There are many reasons why the close clearances required are often impractical, costly, and, in certain cases, even impossible to achieve. Particulate material can be trapped or entrained between rotor and housing surface, causing bindings or arbrasion, or both. Temperature gradients between the housing and rotor, complemented by the fact that the masses of the two components may be significantly different, can result in differential amounts of thermal expansion and cause binding or seizure. It is also known that high pressure differentials can cause bending forces on the shaft which supports the rotor. If close clearances are used, the result is interference between the rotor and cylindrical housing. Additionally, as the physical dimensions of such rotary vane valve units increase the difficulty and cost of manufacture to close tolerances increases significantly.

In order to reduce leakage without the necessity of using such close tolerances, it has been suggested that the cylindrical housing be fitted on each of its ends with gas tight end bells, and the pressurized air or another gas be introduced into the space inside these end bells. This so-called "purge" gas is maintained at a pressure somewhat higher than the maximumgas pressure which acts on the rotor, and its purpose and effect is to prevent particulate matter being handled in the rotary valve from migrating across the rim of the rotor shrouds into the end bells. Not only would the particulate matter eventually fill up the end bells, but also it could cause severe friction and wear on the rims of the rotor shrouds and on the housing surfaces which face the shroud rims.

If there were no purge applied to the end bells, air or gas which the valve is intended to seal against would tend to flow across the rim of the shrouds into the end cavities, toward the region of lower pressure, i.e., from the discharge port to the inlet port in the case where the discharge port was exposed to greater pressure. At the inlet, the flow would be back across the shroud rims, again carrying particulate matter. The purge not only tends to keep the interface between rim of shroud and housing surface relatively free of particles, but also imposes a limitation on leakage.

The rate of air or gas flow, provided that the pressure ratio across the shroud is subcritical, Q(cfm) follows the theory of flow through orifices and is proportional to orifice area and to the square root of the differential pressure across the orifice. Considering that the orifice in this case is that formed by the clearance between the shrouds and the cylindrical housing, the relationship $$Q = A\text{orifice} \sqrt{\Delta P}$$

is applicable regardless of which direction the gas flow takes. The use of an air or gas purge flow, it can be seen, not only minimizes friction and wear that can be caused by migrating particles, but also reduces leakage of the gas from the high pressure side to the low pressure side of the valve.

As the physical size of the rotary valve increases, the manufacturing and operating problems involving close clearances become more pronounced and more costly. The problems of leakage likewise become more significant and the amount of purging necessary to prevent such leakage will also increase. It will be appreciated that increases in purging requirements will also be necessitated as requirements for differential pressure capability grow greater, or as the temperature to which the valve is exposed becomes higher, or as a result of any combination of the above mentioned factors. It will also be appreciated that the purging of the ends bells is an energy-intensive procedure which may also involve a relatively heavy investment in purging equipment. Furthermore, since it is often necessary that a relatively inert fluid such as nitrogen or steam be used as the purging media instead of air, this procedure may also be relatively cost intensive.

In view, therefore, of these problems, my co-inventors and I, in our above referenced related application, suggested a rotary vane valve that was equipped with shrouds at the end of its vanes in which an annular throttle plate was positioned axially outwardly from at least one of the shrouds so that this annular throttle plate was not actually in contact with the shroud but was closely spaced from it. The outer peripheral edge of this annular throttle plate was adjacent the cylinder housing such that it either actually abutted that housing or so that there was only a small gap between this peripheral edge and the cylindrical housing. At the inner edge of the annular throttle plate a purge gas was introduced into the gap between the shroud and the throttle plate. This purge gas flowed first radially outwardly in this gap and then axially inwardly in the gap between the outer peripheral edge of the shroud and the cylindrical housing.

With regard to viscous flow between parallel plates, we noted that it had been known that pressure drop varies inversely as the cube of the spacing between the plates and directly with the length of the flow passage. Thus, due to the existence of relatively narrow gaps between the annular throttle plate and the shroud and the peripheral edge of shroud and the cylindrical housing, gas velocity was relatively high as was pressure drop between the inner edge of the annular throttle plate and the interior of the cylindrical housing.

We also noted that those skilled in the art would appreciate that from the known relationships applicable to viscous flow between parallel plates it would be possible to calculate the particular distance between the annular throttle plate and the shroud which would be preferred under a certain set of circumstances. Since the pressures inside the cylindrical housing are often unpredictable and variable, we also suggested that it would be preferable that a means be provided to adjust the distance between the shroud and the annular control plate.

We also suggested that the outwardly-facing surfaces of the moving rotor shrouds and/or the inwardly-facing surfaces of the stationary annular plates in our rotary vane valve could be provided with smooth surface finishes or could be artifically roughened by any suitable process to increase the frictional resistance to flow between the plates. It was also suggested that plate surfaces could be machined with intermeshing alternating ridge and groove configurations in their surfaces to prevent straight-line flow of gas in the gap, which effect would also increase total seal resistance to flow.

Although we provided a rotary vane valve in which leakage of process fluids and particulate material into the end bell areas was effectively controlled at a relatively low cost, I have observed that relatively greater amounts of purge gas may tend to flow between the shroud and the throttle plate at certain points along the peripheries of the shroud and the throttle plate as compared with other such peripheral points. In particular, when the inlet opening is at a lower pressure than the outlet opening, a greater amount of purge gas will tend to flow toward the inlet opening than toward the outlet opening. Similarly, when the outlet opening is at a lower pressure, a relatively greater amount of gas will flow toward the outlet opening. It is, therefore, the object of my present invention to provide a still further improved rotary vane valve which retains the advantages of our above described prior invention but which is also characterized by a substantially equal rate of flow of purge gas at all points along the periphery of the throttle plate.

SUMMARY OF THE INVENTION

The present invention is a rotary vane valve equipped with shrouds at the end of its vanes in which an annular throttle plate is positioned axially outwardly from at least one of the shrouds so that this annular throttle plate is not actually in contact with the shroud but is closely spaced from it. The outer peripheral edge of this annular throttle plate is adjacent the cylindrical housing such that it either actually abuts that housing or so that there is only a small gap between this peripheral edge and the cylindrical housing. At the inner edge of the annular throttle plate a purge gas is introduced into the gap between the shroud and the throttle plate. This purge gas flows first radially outwardly in this gap and then axially inwardly in the gap between the outer peripheral edge of the shroud and the cylindrical housing. If the inlet is at a lower pressure than the outlet, on the part of the annular throttle plate adjacent the low pressure inlet, means are provided to increase frictional resistance to the outward radial flow of purge gas over that area relative to frictional resistance to such flow which prevails on the opposite side of the throttle plate adjacent the high pressure outlet. On the other hand, if the inlet is at a higher pressure than the outlet, on the part of the annular throttle plate adjacent the low pressure outlet, means would be provided to increase frictional resistence to the outward radial flow of purge gas over that area relative to frictional resistance to such flow which prevails on the opposite side of the throttle plate adjacent the low pressure zone. Thus, in either situation, the overall outward rate of flow of the purge gas will be generally equal on both sides of the throttle plate. A preferred configuration for increasing frictional resistance to the flow of purge gas on the low pressure zone adjacent the inlet would be a plurality of generally arc-shaped grooves which are radially spaced from one another and concentrically interposed between the inner and outer peripheral edges of the throttle plate. Preferably, the high pressure zone adjacent the outlet on the annular throttle plate would be recessed except for a smaller number of arc-shaped grooves on the periphery.

BRIEF DESCRIPTION OF THE DRAWINGS

The invention is further described in the accompanying drawings in which.

DETAILED DESCRIPTION

Figure 1:
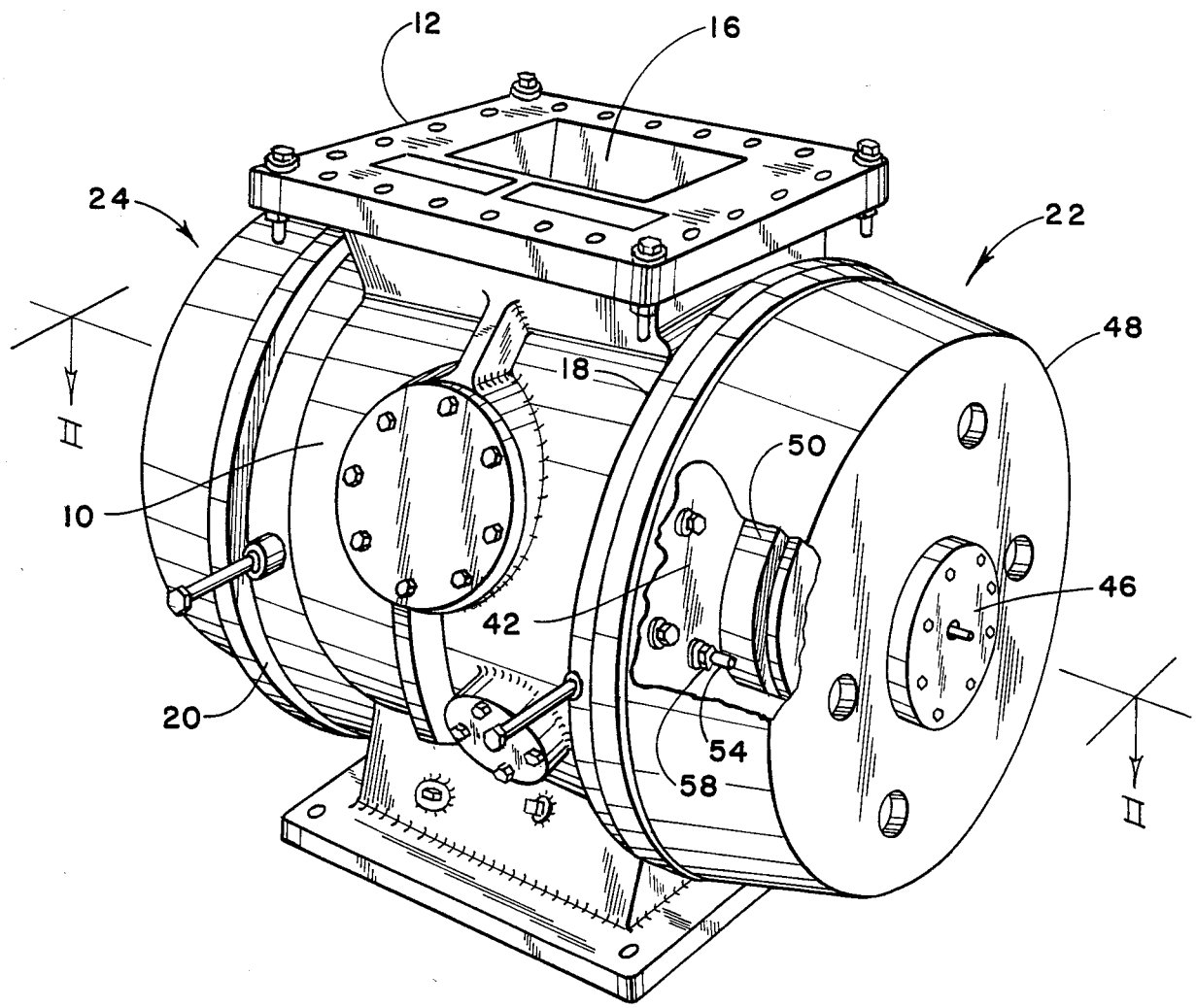
FIG. 1 is partially cut away perspective view of a rotary vane valve representing a preferred embodiment of the present invention.
Figure 2:
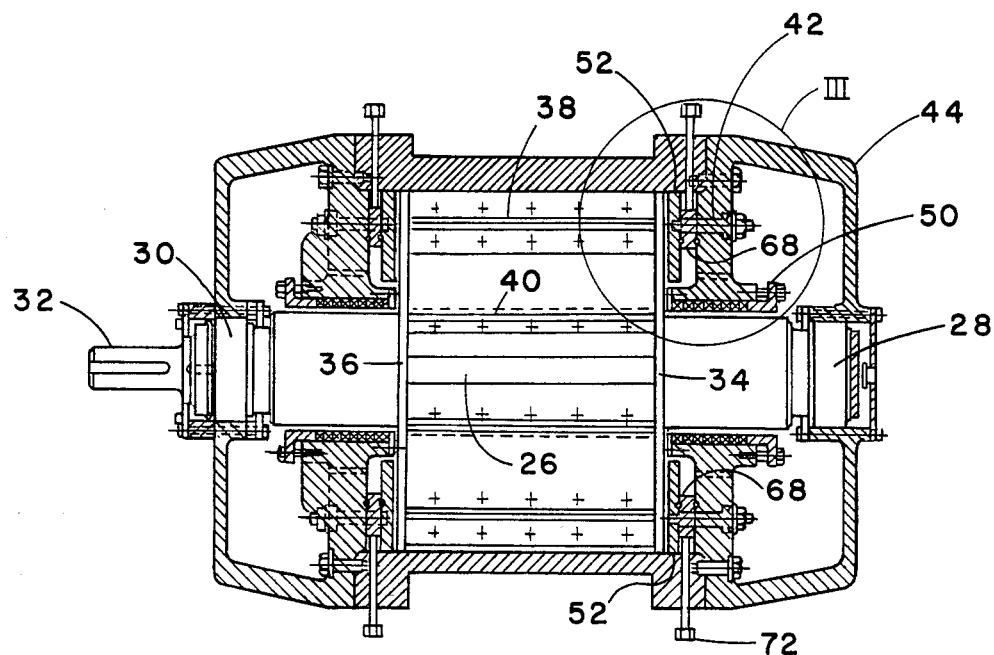
FIG. 2 is a cross sectional view of the rotary vane valve of the present invention taken through line II—II in FIG. 1.
Figure 3:
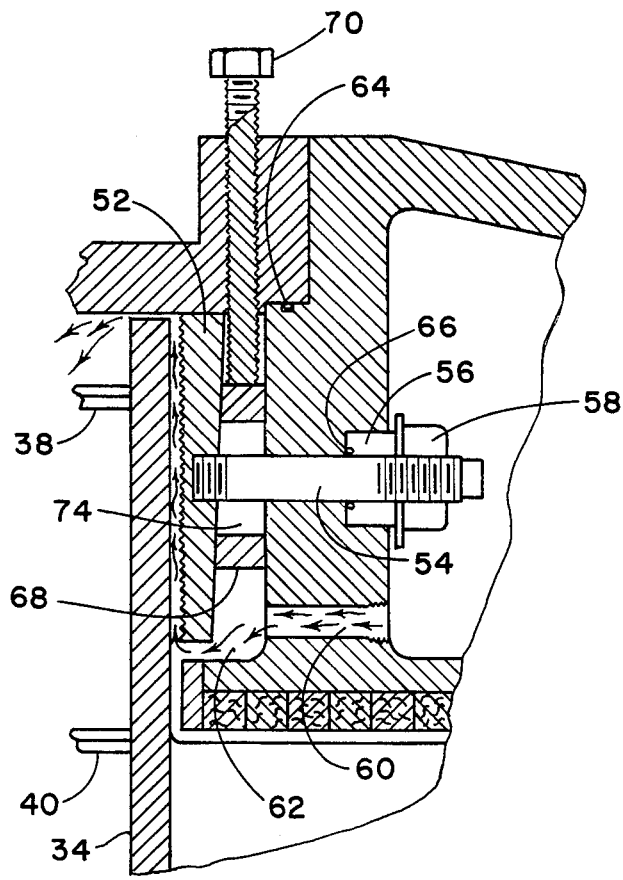
FIG. 3 is an enlarged view of the area within circle III in FIG. 2.

Referring to FIGS. 1-3, it will be seen that the rotary vane valve of the present invention includes a generally cylindrical housing 10. This cylindrical housing has on its opposed sides an upper flange 12, by means of which the valve may be attached to a first line (not shown) at one pressure, and a lower flange 14, by means of which the valve may be attached to a second line (not shown) at a different higher pressure. There is a central inlet opening 16 in the upper flange and an outlet opening (not shown) in the lower flange so that fluid and particulate flow is established when the rotor is turned transversely across the interior of the cylindrical housing from the first line to the second line. On the opposed ends of the cylindrical housing there are end flanges 18 and 20 which are attached, respectively, to end bells 22 and 24 which enclose the terminal ends of the cylindrical housing section.

A central longitudinally axial shaft 26 is positioned within the cylindrical housing and extends outwardly therefrom into the end bells to be mounted at its ends at bearings 28 and 30 so that this shaft is rotatable about its longitudinal axis. At one end the shaft has a keyed extension 32 so that it can be attached to a drive means (not shown). A pair of axially spaced, annulus-shaped shroud members 34 and 36 are welded at their inner edges to the shaft and project transversely and radially outwardly therefrom near the opposed terminal edges of the cylindrical housing so their outer edges are spaced from the cylindrical housing. A plurality of longitudinal vanes as at 38 also project radially from the shaft. Adjacent their terminal ends these vanes have a plurality of apertures by means of which replaceable tips (not shown) may be bolted on to them. As is known in the art, these vanes form a plurality of chambers in which solid material is conveyed from the inlet opening to the outlet opening as the shaft is rotated by the drive means.

End bell 22 includes an inner wall 42 which is fixed to the end flange 18 of the cylindrical housing, an outer wall 44, a bearing housing 46 and generally cylindrical peripheral wall 48. The shaft 26 passes through the inner wall 42 and an annular packing retaining structure 50 is radially interposed between the shaft and the inner wall. It will be noted that end bell 24 is similarly configured and it will be understood that the features of end bell 22 described hereafter will also be included in end bell 24.

Referring particularly to FIG. 3, it will be seen that a throttle plate 52 is spaced axially outwardly from the shroud 34 between that shroud and the inner wall 42 of the end bell 22. This throttle plate is fixed to the end of threaded stud 54 which is retained in position by means retainer 56 and nut 58. The throttle plate will be grooved or will otherwise be suitably roughened in a manner as is hereafter described. A purge gas inlet passageway 60 passes through the inner wall 42 and at its outer end is threaded so as to be connectable to a purge gas line (not shown). At the inner end of this purge gas passageway there is an annular purge gas collection chamber 62 which is adjacent to the inner edge of the annular throttle plate and from where purge gas first flows radially outwardly in the narrow gap between the throttle plate and the shroud and then axially inwardly in the narrow gap between the outer edge of the shroud and the cylindrical housing. When the gap between the shroud and the annular throttle plate is sufficiently narrow, a relatively small amount of purge gas introduced at a relatively low pressure may be used to prevent outward fluid flow from the interior of the cylindrical housing. So that the purge gas remains in its desired path of flow, O-rings as at 64, 65 and 66 are also provided. As will be appreciated by those skilled in the art, it may also be preferable to use an O-ring or some other seal between the annular throttle plate 52 and the cylindrical housing.

The gap between the shroud 34 and the annular throttle plate may also be adjusted by means of a wedge-shaped, annular sliding adjusting plate 68 which is moved by adjusting bolt 70 and a second adjusting bolt 72 (FIG. 2). The wedge shaped, annular sliding adjusting plate 68 continuously abuts the throttle plate 52. The adjusting plate 68 is also thinnest at its edge where it abuts adjusting bolt 70. It increases in thickness toward its opposite side and is thickest at the point where it is abutted by the adjusting bolt 72. Thus, when adjusting bolt 70 is tightened and adjusting bolt 72 is loosened, the adjusting plate 68 will be moved laterally so as to increase the gap between the throttle plate 52 and the shroud 34. When the adjusting bolt 70 is loosened and the adjusting bolt 72 is tightened, the adjusting plate 68 will be moved laterally to decrease the gap between the throttle plate 52 and the shroud 34. It will be observed from the drawing that the throttle plate 52 is also preferably wedge-shaped to accommodate the above described motion. It will be noted that adjusting bolt 72 is displaced from bolt 70 by about 180°. It will also be noted that stud 54 passes through an aperture 74 in adjusting plate 68. This aperture is elongated to allow the upward and downward sliding motion of the adjusting plate. There are also three other aperatures (not shown) in the adjusting plate which are situated at 90° intervals from one another and which are similarly elongated to allow movement of the adjusting plate past fastening means similar to stud 54.

Figure 4:
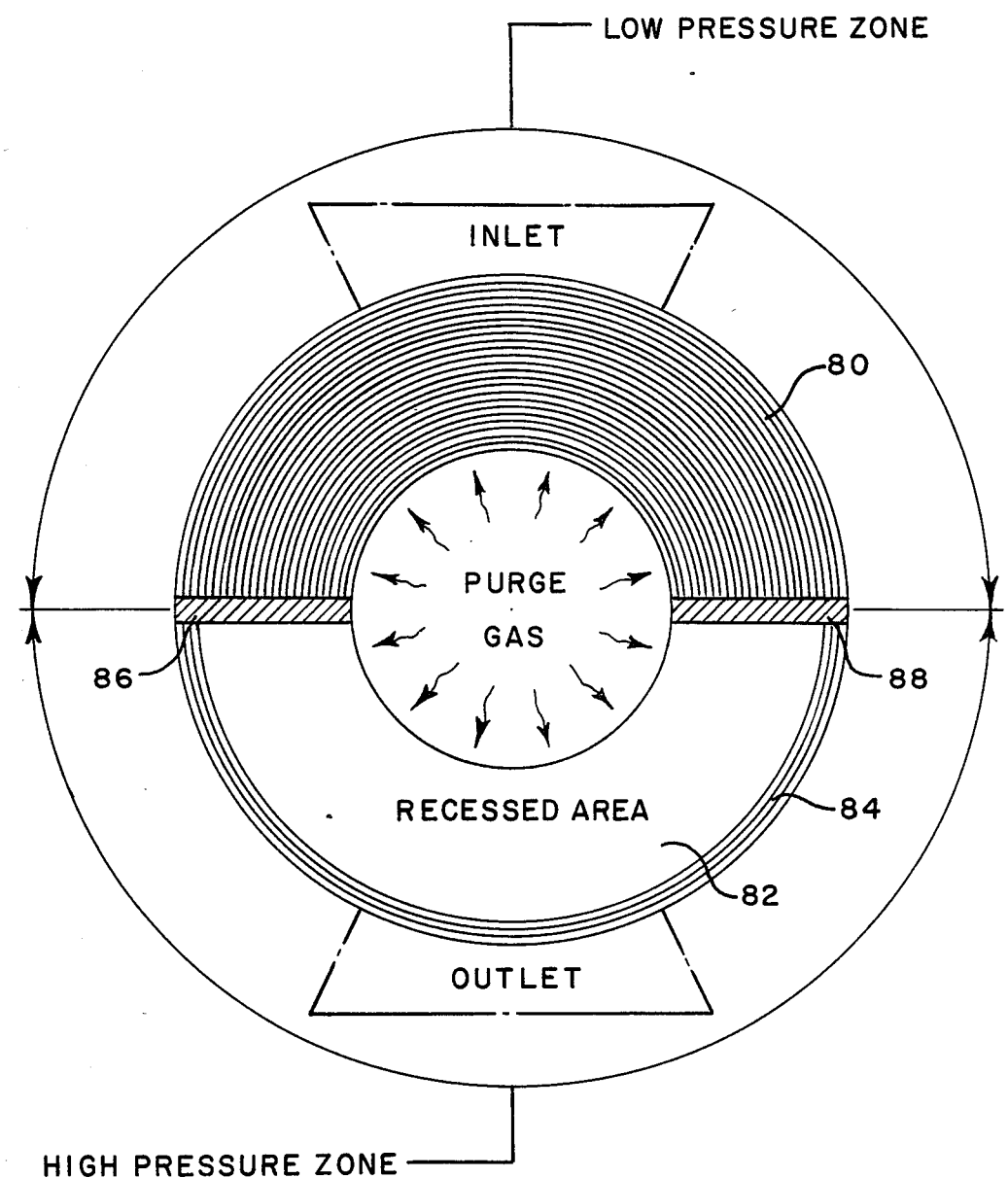
FIG. 4 is a schematic illustration of the inner lateral surface of an annular throttle plate such as the one shown in FIGS. 1-3.

From the above description, it will be appreciated that if the annular throttle plate were structually uniform adjacent both the low pressure inlet and the high pressure outlet, purge gas would tend to flow more readily toward the low pressure inlet than the high pressure outlet. In the rotary vane valve of the present invention, however, this problem is avoided due to the configurations of the inner lateral wall of the annular throttle plate. Referring to FIG. 4 it will be noted that the inner lateral wall is divided into two areas. A low pressure zone is adjacent to the inlet of the valve and a high pressure zone is adjacent the outlet. In the low pressure zone a plurality of arcuate grooves as at 80 are cut into the surface of the throttle plate. These grooves are radially spaced from one another and are concentrically interposed between the inner and outer peripheral edges of the throttle plate. On the opposed side of the throttle plate adjacent the high pressure outlet there is a high pressure zone. This high pressure zone has a recessed area 82 and an outer peripheral grooved area 84. It will thus be appreciated that there will be more frictional resistance to the flow of purge gas over the low pressure zone than over the high pressure zone so that even though a pressure differential between the inlet and the outlet does exist the flow of purge gas toward the inlet and the outlet can be equalized by selecting an appropriate number of grooves to be used on the high pressure and low pressure zones. It may also be possible to affect frictional resistance to purge gas flow by varying the depth or configuration of the grooves. It will also be noted that two radial barriers 86 and 88 are interposed between the low pressure and high pressure zones. These radial barriers serve to restrict the circumferential flow of the purge gas between the low pressure and the high pressure zones. These radial barriers are preferably flush with or raised slightly above the highest points in the low pressure zone.

Figure 5:
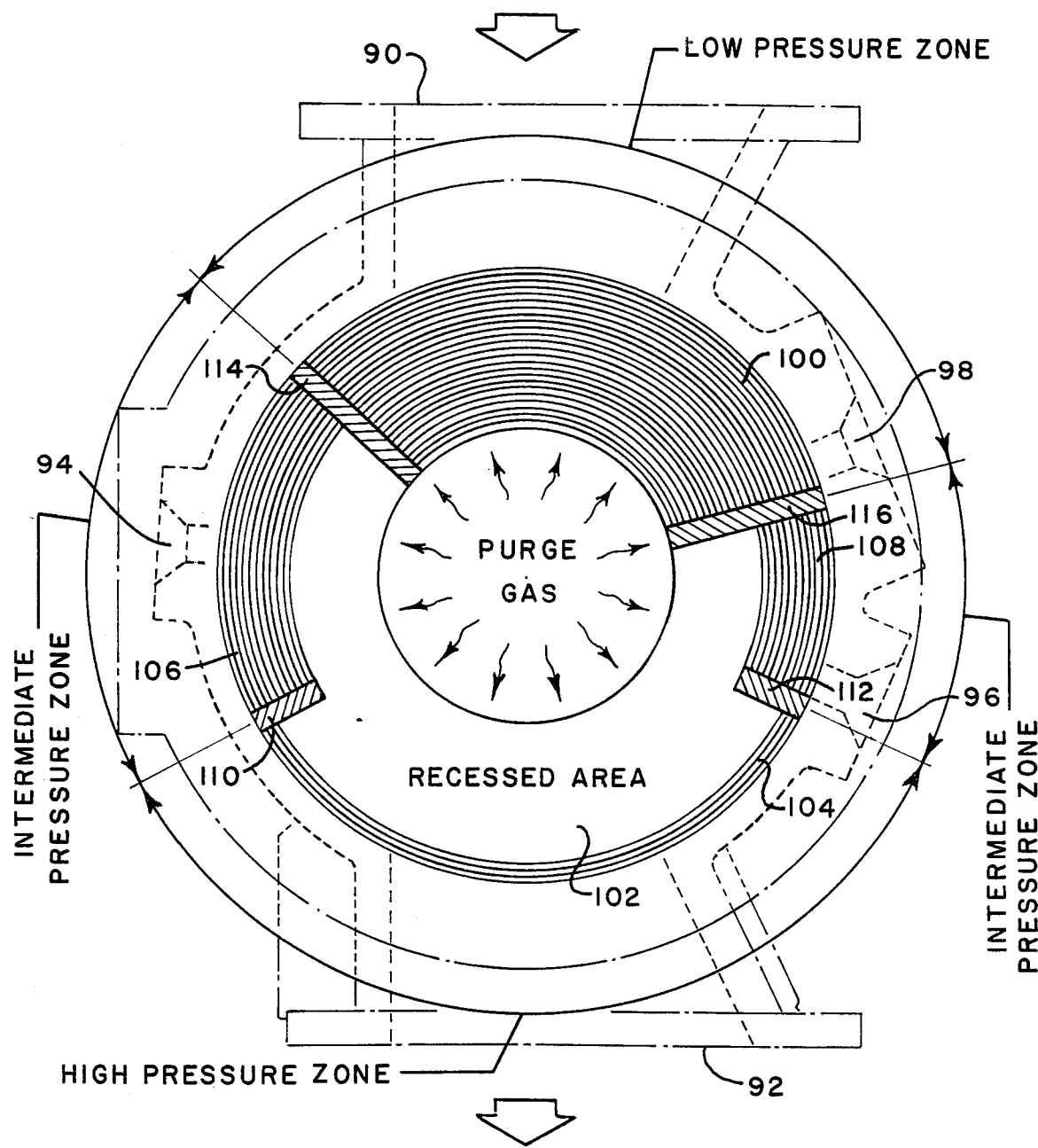
FIG. 5 is a schematic illustration of the inner lateral surface of an annular throttle plate which may be used in a rotary vane valve representing a second embodiment of the present invention.

An annular throttle plate which may be used in another embodiment of the present invention is shown in FIG. 5. Various parts of a rotary vane valve with which such a throttle plate can be used are shown in broken lines. For example, the inlet is shown at numeral 90 and the outlet at 92. Like many rotary vane valves known in the art, this valve also includes across over ports 94 and 96, which are connected by a cross over pipe (not shown) for the purpose of contributing to the equalization of pressure inside the valve between the inlet and outlet openings. A third port 98 is also connected by another pipe (not shown) to the low pressure inlet. It will be appreciated that the above described ports may also be used for the purpose of transferring gases between ancillary equipment and the valve.

It will be noted that the annular throttle plate which is used on such a valve includes a high pressure zone adjacent the inlet and a low pressure zone adjacent the outlet and two intermediate pressure zones interposed between these high pressure and low pressure zones. Like the throttle plate shown in FIG. 4, the low pressure zone of this throttle plate is completely covered with a plurality of radially spaced arcuate grooves as at 100. The low pressure zone also has a recessed area 102 as well as a narrow peripheral grooved area 104 which includes a small number of arcuate, radially spaced grooves. It will also be seen that the two intermediate pressure zones include grooved areas 106 and 108 which are covered by arcuate, radially spaced grooves. These grooved areas in the intermediate pressure zones are wider than the grooved area 104 in the high pressure zone but they do not cover the entire intermediate pressure zones. Between the low pressure zone and the intermediate pressure zones there are two raised, radial barriers 110 and 112. Between the high pressure zone and the grooved areas of the intermediate pressure zones there are also two raised, radial barriers 114 and 116 which extend from the periphery of the throttle plate to the inner edge of the grooved areas of the intermediate pressure zones.

Although in the above described apparatus the inlet opening is at a lower pressure than the outlet opening, it will be appreciated by those skilled in the art that the present invention can readily be adapted for use in situations where opposite conditions of pressure prevail. Referring, for example to FIG. 4, if the inlet where at a higher pressure than the outlet, the throttle plate would be rotated circumferentially by 180° so that the entirely grooved low pressure zone would be adjacent the outlet and the recessed and only partially grooved high pressure zone would be adjacent the inlet.

It will be appreciated that an inexpensive, simple and effective means for controlling gas flow across the outer periphery of the shroud in a rotating vane valve has been described. The need for a close fit between the periphery of the shroud and the cylindrical housing is eliminated as are problems involving temperature differential and shaft deflection. It will also be appreciated that substantially equal amounts of purge gas will flow to all points along the peripheries of the shroud and throttle plates.

Although the invention has been described herein with a certain degree of particularity, it is to be understood that the present disclosure has been made only as an example and that the scope of the invention is defined by what is hereinafter claimed.

What is claimed is:

1. In a rotary vane valve comprising a generally cylindrical housing section with opposed side material inlet and outlet openings allowing transverse material flow through said cylindrical housing section from a low pressure fluid containing means connected to the inlet opening and containing a relatively low pressure fluid to a high pressure fluid containing means connected to the outlet opening and containing a relatively high pressure fluid; a pair of end bell sections enclosing the opposed terminal ends of the cylindrical housing section; a central longitudinal axial shaft positioned within the cylindrical housing section and extending outwardly therefrom to be mounted in bearings contained in said end bell sections so as to be rotatable about its longitudinal axis; a pair of spaced, transversely oriented annular shroud members fixed at their inner edges to the shaft and extending radially outwardly therefrom so as to be spaced at their outer peripheral edges from the cylindrical housing section; a plurality of longitudinally oriented vanes radially projecting from the shaft and being spaced from the cylindrical housing at their terminal ends; at least one annular throttle plate having inner and outer peripheral edges and inner and outer lateral surfaces and said inner lateral surface having a low pressure zone adjacent the inlet opening and a high pressure zone adjacent the outlet opening ad being spaced axially outwardly from one of the shrouds and positioned at its outer peripheral edge adjacent to the cylindrical housing section; means for adjusting the distance between the annular throttle plate and its adjacent shroud; and means for introducing a purge gas at the inner edge of the annular throttle plate between said annular throttle plate and the shroud, such that said purge gas flows first radially outwardly between the inner lateral surface of said annular throttle plate and said shroud and then axially inwardly between the outer peripheral edge of said shroud and the cylindrical housing section to prevent particulate matter from migrating from inside the cylindrical housing section across the outer peripheral edges of the shroud members and into the end bell sections, wherein the improvement comprises a fluid flow resistance means on the low pressure zone of the inner lateral surface of the annular throttle plate for increasing frictional relative resistance to the outward radial flow of purge gas between the shroud and the low pressure zone of the inner lateral surface of the throttle plate as compared to the frictional resistance of the outward radial flow of purge gas between the shroud and the high pressure zone of the inner lateral surface of the annular throttle plate.

2. The rotary vane valve as defined in claim 1 wherein a plurality of generally arcuate grooves are radially spaced from one another and are concentrically interposed between the inner and outer peripheral edges of the throttle plate on the low pressure zone.

3. The rotary vane valve as defined in claim 2 wherein at least a part of the high pressure zone is recessed to a point below the plane of the low pressure zone.

4. The rotary vane valve as defined in claim 3 wherein a second plurality of generaly arcuate grooves are radially spaced from one another and are concentrically interposed between the inner and outer peripheral edges of the high pressure zone and wherein said second plurality of generally arcuate grooves on the high pressure zone is numerically smaller than the plurality of arcuate grooves on the low pressure zone.

5. The rotary vane valve as defined in claim 4 wherein at least two opposed cross over ports extend through the cylindrical housing at points between the inlet and outlet openings and are connected by cross over piping and wherein opposed first and second intermediate pressure zones are interposed between said high and low pressure zones adjacent each of said cross over ports and wherein a third plurality and a fourth plurality of arcuate grooves are radially spaced from one another between the inner and outer peripheral edges of the throttle plate, respectively, on the first and second intermediate pressure zones and said third and fourth plurality of grooves are each numerically less than the plurality of grooves on the low pressure zone but numerically greater than the second plurality of grooves on the high pressure zone.

6. The rotary vane valve as defined in claim 1 wherein the low pressure zone of the inner lateral surface of the throttle plate is roughened.

7. In a rotary vane valve comprising a generally cylindrical housing section with opposed side material inlet and outlet openings allowing transverse material flow through said cylindrical housing section from a high pressure fluid containing means connected to the inlet opening and containing a relatively high pressure fluid to a low pressure fluid containing means connected to the outlet opening and containing a relatively low pressure fluid; a pair of end bell sections enclosing the opposed terminal ends of the cylindrical housing section; a central longitudinal axial shift positioned within the cylindrical housing section and extending outwardly therefrom to be mounted in bearings contained in said end bell sections so as to be rotatable about its longitudinal axis; a pair of spaced, transversely oriented annular shroud members fixed at their inner edges to the shaft and extending radially outwardly therefrom so as to be spaced at their outer peripheral edges from the cylindrical housing section; a plurality of longitudinally oriented vanes radially projecting from the shaft and being spaced from the cylindrical housing at their terminal ends; at least one annular throttle plate having inner and outer peripheral edges and inner and outer lateral surfaces and said inner lateral surface having a low pressure zone adjacent the outlet opening and a high pressure zone adjacent the inlet opening and being spaced axially outwardly from one of the shrouds and positioned at its outer peripheral edge adjacent to the cylindrical housing section; means for adjusting the distance between the annular throttle plate and its adjacent shroud; and means for introducing a purge gas at the inner edge of the annular throttle plate between said annular throttle plate and the shroud, such that said purge gas flows first radially outwardly between the inner lateral surface of said annular throttle plate and said shroud and then axially inwardly between the outer peripheral edge of said shroud and the cylindrical housing section to prevent particulate matter from migrating from inside the cylindrical housing section across the outer peripheral edges of the shroud members and into the end bell sections, wherein the improvement comprises a fluid flow resistance means on the low pressure zone of the inner lateral surface of the annular throttle plate for increasing frictional relative resistance to the outward radial flow of purge gas between the shroud and the low pressure zone of the inner lateral surface of the throttle plate as compared to the frictional resistance of the outward radial flow of purge gas between the shroud and the high pressure zone of the inner lateral surface of the annular throttle plate.

8. The rotary vane as defined in claim 7 wherein a plurality of generally arcuate grooves are radially spaced from one another and are concentrically interposed between the inner and outer peripheral edges of the throttle plate on the low pressure zone.

9. The rotary vane valve as defined in claim 8 wherein at least a part of the high pressure zone is recessed to a point below the plane of the low pressure zone.

10. The rotary vane valve as defined in claim 9 wherein a second plurality of generally arcuate grooves are radially spaced from one another and are concentrically interposed between the inner and outer peripheral edges of the high pressure zone and wherein said second plurality of generally arcuate grooves on the high pressure zone is numerically smaller than the plurality of arcuate grooves on the low pressure zone.

11. The rotary vane valve as defined in claim 10 wherein at least two opposed cross over ports extend through the cylindrical housing at points between the inlet and outlet openings and are connected by cross over piping and wherein opposed first and second intermediate pressure zones are interposed between said high and low pressure zones adjacent each of said cross over ports and wherein a third plurality and a fourth plurality of arcuate grooves are radially spaced from one another between the inner and outer peripheral edges of the throttle plate, respectively, on the first and second intermediate pressure zones and said third and fourth plurality of grooves are each numerically less than the plurality of grooves on the low pressure zone but numerically greater than the second plurality of grooves on the high pressure zone.

12. The rotary vane valve as defined in claim 7 wherein the low pressure zone of the inner lateral surface of the throttle plate is roughened.

* * * * *